(12) United States Patent
Sudeji

(10) Patent No.: US 11,130,848 B2
(45) Date of Patent: Sep. 28, 2021

(54) LAMINATED OPTICAL FILM AND TOUCH PANEL

(71) Applicant: ZEON CORPORATION, Tokyo (JP)

(72) Inventor: Hironari Sudeji, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 16/647,521

(22) PCT Filed: Sep. 19, 2018

(86) PCT No.: PCT/JP2018/034620
§ 371 (c)(1),
(2) Date: Mar. 16, 2020

(87) PCT Pub. No.: WO2019/065401
PCT Pub. Date: Apr. 4, 2019

(65) Prior Publication Data
US 2020/0223995 A1    Jul. 16, 2020

(30) Foreign Application Priority Data

Sep. 27, 2017  (JP) .............................. JP2017-187002

(51) Int. Cl.
*C08J 5/18*     (2006.01)
*B32B 27/08*    (2006.01)
(Continued)

(52) U.S. Cl.
CPC ................ *C08J 5/18* (2013.01); *B32B 27/08* (2013.01); *B32B 27/302* (2013.01); *C08L 53/02* (2013.01);
(Continued)

(58) Field of Classification Search
None
See application file for complete search history.

(56) References Cited

U.S. PATENT DOCUMENTS

2002/0136853 A1   9/2002  Koji et al.
2007/0285777 A1*  12/2007 Toyoshima ............ G02B 5/305
                                              359/487.05
(Continued)

FOREIGN PATENT DOCUMENTS

CN    102629023 A    8/2012
CN    105808006 A    7/2016
(Continued)

OTHER PUBLICATIONS

Nov. 27, 2018, International Search Report issued in the International Patent Application No. PCT/JP2018/034620.
(Continued)

*Primary Examiner* — Ifedayo B Iluyomade
(74) *Attorney, Agent, or Firm* — Kenja IP Law PC

(57) ABSTRACT

An optical layered film includes at least one A layer including a thermoplastic resin [A] and a B layer formed of a thermoplastic resin [B], wherein the at least one A layer is provided on at least one of surfaces of the B layer, a thickness-direction retardation Rthb of the B layer satisfies the following formula (1), and a tensile elongation at break Sa of a 1.5 mm-thick film (a1) formed of the thermoplastic resin [A] satisfies the following formula (2): (1) |Rthb|≤40 nm, and (2) Sa≥100%.

14 Claims, 4 Drawing Sheets

(51) Int. Cl.
  *B32B 27/30* (2006.01)
  *C08L 53/02* (2006.01)
  *G02B 1/08* (2006.01)
  *G06F 3/041* (2006.01)

(52) U.S. Cl.
  CPC .............. *C08L 53/025* (2013.01); *G02B 1/08* (2013.01); *G06F 3/041* (2013.01); *B32B 2250/02* (2013.01); *B32B 2250/246* (2013.01); *B32B 2307/546* (2013.01); *C08J 2353/02* (2013.01); *C08J 2453/02* (2013.01); *C08L 2205/025* (2013.01); *C08L 2205/03* (2013.01); *G06F 2203/04102* (2013.01)

(56) References Cited

U.S. PATENT DOCUMENTS

| | | | | |
|---|---|---|---|---|
| 2010/0207292 | A1* | 8/2010 | Noritsune | B29C 48/397 264/211.11 |
| 2012/0194767 | A1 | 8/2012 | Kaihoko | |
| 2018/0043663 | A1 | 2/2018 | Manabu | |
| 2018/0065348 | A1 | 3/2018 | Obuchi et al. | |
| 2018/0319127 | A1* | 11/2018 | Katami | C09J 11/04 |

FOREIGN PATENT DOCUMENTS

| | | | | |
|---|---|---|---|---|
| JP | 2002292808 | A | 10/2002 | |
| JP | 2014149508 | * | 8/2014 | G02B 5/30 |
| JP | 2014149508 | A | 8/2014 | |
| JP | WO-2017014242 | A1 * | 1/2017 | G02B 5/3033 |
| WO | 2016147764 | A1 | 9/2016 | |
| WO | 2016152871 | A1 | 9/2016 | |

OTHER PUBLICATIONS

Mar. 31, 2020, International Preliminary Report on Patentability issued in the International Patent Application No. PCT/JP2018/034620.

* cited by examiner

LAMINATED OPTICAL FILM AND TOUCH PANEL

FIELD

The present invention relates to an optical layered film and a touch panel.

BACKGROUND

An optical film may be used in a bent form in some use applications. Thus optical films with bend resistance have been under development (Patent Literatures 1 and 2).

CITATION LIST

Patent Literature

Patent Literature 1: International Publication No. 2016/147764 (corresponding publication: U.S. patent application publication No. 2018/043663)

Patent Literature 2: Japanese Patent Application Laid-Open No. 2002-292808 A (corresponding publication: U.S. patent application publication No. 2002/136853)

SUMMARY

Technical Problem

However, techniques described in Patent Literatures 1 and 2 failed to sufficiently enhance the bend resistance of an optical film that had poor bendability.

Furthermore, a flexible image display element has been developed in recent years and members of a touch panel that includes the image display element are also required to have bend resistance.

Accordingly, an optical layered film with good bend resistance is demanded.

Solution to Problem

The present inventors conducted intensive study to solve the above-described problem. As a result, the present inventors have found that the above-described problem can be solved by providing an A layer on at least one of the surfaces of a B layer formed of a thermoplastic resin [B], wherein the A layer includes a thermoplastic resin that has a tensile elongation at break of a certain value or more when formed into a film of a particular thickness. Thus, the present inventors have completed the present invention. Specifically, the present invention provides the following.

<1> An optical layered film comprising at least one A layer including a thermoplastic resin [A] and a B layer formed of a thermoplastic resin [B], wherein the at least one A layer is provided on at least one of surfaces of the B layer, a thickness-direction retardation Rthb of the B layer satisfies the following formula (1), and a tensile elongation at break Sa of a 1.5 mm-thick film (a1) formed of the thermoplastic resin [A] satisfies the following formula (2):

$$|Rthb| \leq 40 \text{ nm, and} \quad (1)$$

$$Sa \geq 100\%. \quad (2)$$

<2> The optical layered film according to <1>, wherein a modulus of elasticity in flexure Ea of a 4 mm-thick film (a2) formed of the thermoplastic resin [A] satisfies the following formula (3), and a modulus of elasticity in flexure Eb of a 4 mm-thick film (b) formed of the thermoplastic resin [B] satisfies the following formula (4):

$$300 \text{ MPa} \leq Ea \leq 900 \text{ MPa, and} \quad (3)$$

$$2200 \text{ MPa} \leq Eb \leq 2800 \text{ MPa}. \quad (4)$$

<3> The optical layered film according to <1> or <2>, wherein the thermoplastic resin [A] includes a hydrogenated product [2] of a block copolymer or an alkoxysilyl group-modified product [3] of the hydrogenated product [2] of the block copolymer, the hydrogenated product [2] of the block copolymer is a substance having a structure formed by hydrogenating the block copolymer [1], the block copolymer [1] includes two or more polymer blocks [C] per one molecule of the block copolymer [1] containing an aromatic vinyl compound unit, and one or more polymer blocks [D] per one molecule of the block copolymer [1] containing a chain conjugated diene compound unit, and a ratio (wC/wD) of a weight fraction wC of the polymer block [C] in an entirety of the block copolymer [1] with respect to a weight fraction wD of the polymer block [D] in the entirety of the block copolymer [1] is 30/70 to 60/40, and the hydrogenated product [2] of the block copolymer is a substance in which carbon-carbon unsaturated bonds of a main chain and a side chain of the block copolymer [1] and carbon-carbon unsaturated bonds of an aromatic ring thereof have been hydrogenated.

<4> The optical layered film according to <3>, wherein the thermoplastic resin [A] includes the alkoxysilyl group-modified product [3] of the hydrogenated product [2] of the block copolymer.

<5> The optical layered film according to any one of <1> to <4>, wherein a tensile elongation at break Sb of the B layer satisfies the following formula (5):

$$5\% \leq Sb \leq 60\%. \quad (5)$$

<6> The optical layered film according to any one of <1> to <5>, wherein the thermoplastic resin [B] includes a polymer containing an alicyclic structure.

<7> The optical layered film according to any one of <1> to <6>, comprising two A layers and wherein each of the A layers is provided on each of both surfaces of the B layer.

<8> A touch panel comprising a touch sensor member and an image display element, wherein the touch sensor member includes a first electroconductive layer, the optical layered film according to any one of <1> to <7>, and a second electroconductive layer in this order, and is provided on a viewing side of the image display element.

<9> A touch panel comprising a touch sensor member and an image display element, wherein the touch sensor member includes a first electroconductive layer, the optical layered film according to any one of <1> to <6>, and a second electroconductive layer in this order, and is provided on a viewing side of the image display element, the image display element is capable of being bent with a surface thereof on a viewing side thereof being inner side, and the touch sensor member is disposed such that the surface on the viewing side of the image display element faces a surface of the optical layered film on a side of the A layer.

<10> A touch panel comprising a touch sensor member and an image display element, wherein the touch sensor member includes a first electroconductive layer, the optical layered film according to any one of <1> to <6>, and a second electroconductive layer in this order, and is provided on a viewing side of the image display element, the image display element is capable of being bent with a surface thereof on a viewing side thereof being outer side, and the touch sensor member is disposed such that the surface on the viewing side of the image display element faces a surface of the optical layered film on a side of the B layer.

Advantageous Effects of Invention

According to the present invention, an optical layered film with good bend resistance can be provided.

DESCRIPTION OF EMBODIMENTS

Figure 1:
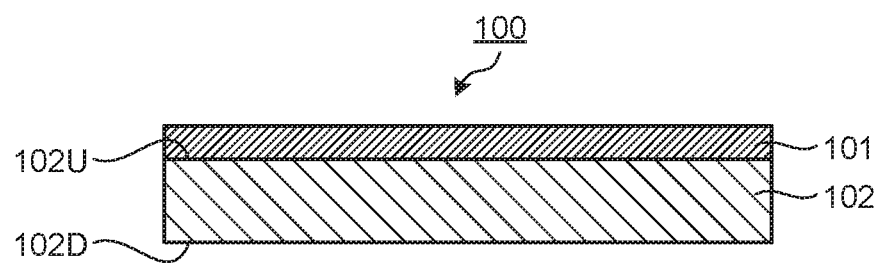
FIG. 1 is a cross-sectional view schematically illustrating Embodiment F-1 of an optical layered film.

Hereinafter, the present invention will be described in detail with reference to embodiments and examples. However, the present invention is not limited to the following embodiments and examples, and may be freely modified for implementation without departing from the scope of claims of the present invention and the scope of their equivalents. The same element may be denoted by the same symbol and the description thereof may be omitted.

In the following description, a direction of an element being "parallel", "perpendicular", and "orthogonal" may allow an error within the range of not impairing the advantageous effects of the present invention, for example, within a range of ±5°, unless otherwise specified.

In the following description, a thickness-direction retardation Rth of a film is a value represented by $Rth=\{(nx+ny)/2-nz\}\times d$, unless otherwise specified. Herein, nx represents a refractive index in a direction in which the maximum refractive index is given among directions perpendicular to the thickness direction of the film (in-plane directions), ny represents a refractive index in a direction, among the aforementioned in-plane directions of the film, orthogonal to the direction giving nx, nz represents a refractive index in the thickness direction of the film, and d represents the thickness of the film. The wavelength of retardation measurement is 590 nm unless otherwise specified.

(1. Optical Layered Film)

The optical layered film of the present invention includes at least one A layer including a thermoplastic resin [A] and a B layer formed of a thermoplastic resin [B], wherein the aforementioned at least one A layer is provided on at least one of the surfaces of the aforementioned B layer. That is, the optical layered film of the present invention includes one or more B layers and one or more A layers provided on one or both of the surfaces of the B layer.

The thickness-direction retardation Rthb of the aforementioned B layer and the tensile elongation at break Sa of a 1.5 mm-thick film (a1) formed of the aforementioned thermoplastic resin [A] satisfy the following formula (1) and formula (2).

$$|Rthb| \leq 40 \text{ nm} \quad (1)$$

$$Sa \geq 100\% \quad (2)$$

Herein, |Rthb| represents the absolute value of the thickness-direction retardation Rthb of the B layer.

(1.1. A Layer)

The A layer includes the thermoplastic resin [A].

(Thermoplastic Resin [A])

The thermoplastic resin [A] usually includes a thermoplastic polymer, and further includes an optional component, if necessary.

The containing ratio of the thermoplastic polymer in the thermoplastic resin [A] is preferably 55% by weight or more, more preferably 60% by weight or more, and still more preferably 65% by weight or more, relative to the total weight of the thermoplastic resin [A]. The containing ratio of the thermoplastic polymer in the thermoplastic resin [A] may be 100% by weight or less.

Examples of the polymers included in the thermoplastic resin [A] may include an aliphatic olefin polymer such as polyethylene and polypropylene; an alicyclic olefin polymer; a polyester such as polyethylene terephthalate and polybutylene terephthalate; a polyarylene sulfide such as polyphenylene sulfide; a polyvinyl alcohol; a polycarbonate; a polyarylate; a cellulose ester polymer; a polyethersulfone; a polysulfone; a polyallylsulfone; a polyvinylchloride; a rod-like liquid crystal polymer; a polystyrene-based polymer including a homopolymer of styrene or a styrene derivative or a copolymer of styrene or a styrene derivative with an optional monomer; a hydrogenated product of a copolymer of an aromatic compound such as styrene and a conjugated diene such as butadiene or isoprene (including a product in which an aromatic ring thereof has been hydrogenated); a polyacrylonitrile; a polymethyl methacrylate; and multiple copolymers of these. Examples of the optional monomer that may be employed as a monomer for a polystyrene-based polymer may include acrylonitrile, maleic anhydride, methyl methacrylate, and butadiene. As these monomers, one type thereof may be solely used, and two or more types thereof may be used in combination at any ratio.

The thermoplastic resin [A] preferably includes a hydrogenated product [2] of a block copolymer or an alkoxysilyl group-modified product [3] of the aforementioned hydrogenated product [2] of the block copolymer.

(Hydrogenated Product [2] of Block Copolymer)

The hydrogenated product [2] of the block copolymer is a substance having a structure formed by hydrogenating the block copolymer [1] described below. However, the hydrogenated product [2] of the block copolymer is not limited by its producing method. Hereinafter, the hydrogenated product [2] of the block copolymer is also referred to as "hydrogenated product [2]".

(Block Copolymer [1])

The block copolymer [1] is a block copolymer having two or more polymer blocks [C] per one molecule of the block copolymer [1] and one or more polymer blocks [D] per one molecule of the block copolymer [1].

The polymer block [C] is a polymer block containing an aromatic vinyl compound unit. The aromatic vinyl compound unit refers to a structural unit having a structure formed by polymerizing an aromatic vinyl compound. However, the aromatic vinyl compound unit is not limited by its producing method.

Examples of the aromatic vinyl compound corresponding to the aromatic vinyl compound unit included in the polymer block [C] may include styrene; a styrene compound having an alkyl group of 1 to 6 carbon atoms as a substituent such as α-methylstyrene, 2-methylstyrene, 3-methylstyrene, 4-methylstyrene, 2,4-dimethylstyrene, 2,4-diisopropylstyrene, 4-t-butylstyrene, and 5-t-butyl-2-methylstyrene; a styrene compound having a halogen atom as a substituent such as 4-chlorostyrene, dichlorostyrene, and 4-monofluorostyrene; a styrene compound having an alkoxy group of 1 to 6 carbon atoms as a substituent such as 4-methoxystyrene; a styrene compound having an aryl group as a substituent such as 4-phenylstyrene; and a vinylnaphthalene compound such as 1-vinylnaphthalene and 2-vinylnaphthalene. As these compounds, one type thereof may be solely used, and two or more types thereof may be used in combination at any ratio. Among these, an aromatic vinyl compound which does not include a polar group such as styrene and styrene compounds having an alkyl group of 1 to 6 carbon atoms as a substituent is preferable because of its low hygroscopicity, and styrene is particularly preferable from the viewpoint of easy industrial availability.

The containing ratio of the aromatic vinyl compound unit in the polymer block [C] is preferably 90% by weight or more, more preferably 95% by weight or more, and particularly preferably 99% by weight or more. The large amount of the aromatic vinyl compound unit in the polymer block [C] as described above can increase hardness and heat resistance of the A layer.

The polymer block [C] may include an optional structural unit other than the aromatic vinyl compound unit. The polymer block [C] may include one type of the optional structural unit solely, and may include two or more types thereof in combination at any ratio.

Examples of the optional structural unit which may be contained in the polymer block [C] may include a chain conjugated diene compound unit. The chain conjugated diene compound unit refers to a structural unit having a structure formed by polymerizing a chain conjugated diene compound. Examples of the chain conjugated diene compound corresponding to the chain conjugated diene compound unit may include the same examples as those mentioned as examples of the chain conjugated diene compound corresponding to the chain conjugated diene compound unit included in the polymer block [D].

Examples of the optional structural unit which may be contained in the polymer block [C] may include a structural unit having a structure formed by polymerizing an optional unsaturated compound other than the aromatic vinyl compound and the chain conjugated diene compound. Examples of the optional unsaturated compounds may include a vinyl compound such as a chain vinyl compound and a cyclic vinyl compound; an unsaturated cyclic acid anhydride; and an unsaturated imido compound. These compounds may have a substituent such as a nitrile group, an alkoxycarbonyl group, a hydroxycarbonyl group, or a halogen group.

Among these, from the viewpoint of hygroscopicity, a vinyl compound having no polar group such as a chain olefin of 2 to 20 carbon atoms per one molecule such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; and a cyclic olefin of 5 to 20 carbon atoms per one molecule such as vinyl cyclohexane is preferable. A chain olefin of 2 to 20 carbon atoms per one molecule is more preferable, and ethylene and propylene are particularly preferable.

The containing ratio of the optional structural unit in the polymer block [C] is preferably 10% by weight or less, more preferably 5% by weight or less, and particularly preferably 1% by weight or less.

The number of the polymer blocks [C] in one molecule of the block copolymer [1] is preferably 2 or more, and is preferably 5 or less, more preferably 4 or less, and particularly preferably 3 or less. The plurality of polymer blocks [C] in one molecule may be the same as or different from each other.

When a plurality of different polymer blocks [C] are present in one molecule of the block copolymer [1], the weight-average molecular weight of the polymer block having the largest weight-average molecular weight among the polymer blocks [C] is denoted by Mw(A1) and the weight-average molecular weight of the polymer block having the smallest weight-average molecular weight among the polymer blocks [C] is denoted by Mw(A2). The ratio "Mw(A1)/Mw(A2)" of Mw(A1) and Mw(A2) is preferably 4.0 or less, more preferably 3.0 or less, and particularly preferably 2.0 or less. With this feature, variations in various property values can be suppressed to a low level.

The polymer block [D] is a polymer block containing a chain conjugated diene compound unit. As described above, the chain conjugated diene compound unit refers to a structural unit having a structure formed by polymerizing a chain conjugated diene compound. However, the chain conjugated diene compound unit is not limited by its producing method.

Examples of the chain conjugated diene compound corresponding to the chain conjugated diene compound unit included in the polymer block [D] may include 1,3-butadiene, isoprene, 2,3-dimethyl-1,3-butadiene, and 1,3-pentadiene. As the compounds, one type thereof may be solely used, and two or more types thereof may be used in combination at any ratio. Among these, a chain conjugated diene compound containing no polar group is preferable, and 1,3-butadiene and isoprene are particularly preferable, because hygroscopicity can be lowered.

The containing ratio of the chain conjugated diene compound unit in the polymer block [D] is preferably 70% by weight or more, more preferably 80% by weight or more, and particularly preferably 90% by weight or more. The large amount of the chain conjugated diene compound unit in the polymer block [D] as described above can improve flexibility of the A layer.

The polymer block [D] may include an optional structural unit other than the chain conjugated diene compound unit. The polymer block [D] may include one type of the optional structural unit solely, and may include two or more types thereof in combination at any ratio.

Examples of the optional structural units which may be included in the polymer block [D] may include an aromatic vinyl compound unit and a structural unit having a structure formed by polymerizing an optional unsaturated compound other than the aromatic vinyl compound and the chain conjugated diene compound. Examples of these aromatic vinyl compound unit and structural unit having a structure formed by polymerizing an optional unsaturated compound may include the same examples as those exemplified as those which may be contained in the polymer block [C].

The containing ratio of the optional structural unit in the polymer block [D] is preferably 30% by weight or less, more preferably 20% by weight or less, and particularly preferably 10% by weight or less. The low containing ratio of the optional structural unit in the polymer block [D] can improve flexibility of the A layer.

The number of the polymer blocks [D] in one molecule of the block copolymer [1] is usually 1 or more, and may be 2 or more. When the number of the polymer blocks [D] in the block copolymer [1] is two or more, the polymer blocks [D] may be the same as or different from each other.

When a plurality of different polymer blocks [D] are present in one molecule of the block copolymer [1], the weight-average molecular weight of the polymer block having the largest weight-average molecular weight among the polymer blocks [D] is denoted by Mw(B1) and the weight-average molecular weight of the polymer block having the smallest weight-average molecular weight among the polymer blocks [D] is denoted by Mw(B2). The ratio "Mw(B1)/Mw(B2)" of Mw(B1) and Mw(B2) is preferably 4.0 or less, more preferably 3.0 or less, and particularly preferably 2.0 or less. With this feature variations in various property values can be suppressed to a low level.

The block form of the block copolymer [1] may be a chain type block or a radial type block. Among these, a chain type block is preferable because it has excellent mechanical strength. When the block copolymer [1] has the form of a chain type block, it is preferable that the polymer blocks [C] are present at both ends of the molecular chain of the block copolymer [1] because it is possible to suppress the stickiness of the A layer to a desired low value.

A particularly preferably block form of the block copolymer [1] is a triblock copolymer in which the polymer blocks [C] are bonded to both ends of the polymer block [D] as represented by [C]-[D]-[C]; and a pentablock copolymer in which the polymer blocks [D] are bonded to both ends of the polymer block [C], and the polymer blocks [C] are further bonded to the other ends of both the polymer blocks [D] as represented by [C]-[D]-[C]-[D]-[C]. In particular, the triblock copolymer of [C]-[D]-[C] is particularly preferable because it can be easily produced and the properties can be easily controlled within desired ranges.

In the block copolymer [1], the ratio (wC/wD) of the weight fraction wC of the polymer block [C] in the entirety of the block copolymer [1] with respect to the weight fraction wD of the polymer block [D] in the entirety of the block copolymer [1] falls within a specific range. Specifically, the aforementioned ratio (wC/wD) is usually 20/80 or more, preferably 25/75 or more, more preferably 30/70 or more, and particularly preferably 40/60 or more, and is usually 60/40 or less, and preferably 55/45 or less. When the aforementioned ratio wC/wD is equal to or more than the lower limit value of the aforementioned range, hardness and heat resistance of the A layer can be improved and birefringence can be reduced. When the aforementioned ratio wC/wD is equal to or less than the upper limit value of the aforementioned range, flexibility of the A layer can be improved. Herein, the weight fraction wC of the polymer block [C] indicates the weight fraction of the entire polymer block [C], and the weight fraction wD of the polymer block [D] indicates the weight fraction of the entire polymer block [D].

The weight-average molecular weight (Mw) of the aforementioned block copolymer [1] is preferably 40,000 or more, more preferably 50,000 or more, and particularly preferably 60,000 or more, and is preferably 200,000 or less, more preferably 150,000 or less, and particularly preferably 100,000 or less.

The molecular weight distribution (Mw/Mn) of the block copolymer [1] is preferably 3 or less, more preferably 2 or less, and particularly preferably 1.5 or less, and is preferably 1.0 or more. Herein, Mn represents the number-average molecular weight.

The weight-average molecular weight (Mw) and molecular weight distribution (Mw/Mn) of the aforementioned block copolymer [1] may be measured as a polystyrene-equivalent value by gel permeation chromatography (GPC) using tetrahydrofuran (THF) as a solvent.

Examples of the method for producing the block copolymer [1] may include a method of alternately polymerizing a monomer composition (a) containing an aromatic vinyl compound and a monomer composition (b) containing a chain conjugated diene compound by a method such as living anionic polymerization; and a method of sequentially polymerizing the monomer composition (a) containing an aromatic vinyl compound and the monomer composition (b) containing a chain conjugated diene compound, and then coupling the ends of the polymer blocks [D] with a coupling agent.

The containing amount of the aromatic vinyl compound in the monomer composition (a) is preferably 90% by weight or more, more preferably 95% by weight or more, and particularly preferably 99% by weight or more. The monomer composition (a) may contain an optional monomer component other than the aromatic vinyl compound. Examples of the optional monomer component may include a chain conjugated diene compound and an optional unsaturated compound. The amount of the optional monomer component is preferably 10% by weight or less, more preferably 5% by weight or less, and particularly preferably 1% by weight or less, relative to the monomer composition (a).

The containing amount of the chain conjugated diene compound in the monomer composition (b) is preferably 70% by weight or more, more preferably 80% by weight or more, and particularly preferably 90% by weight or more. The monomer composition (b) may contain an optional monomer component other than the chain conjugated diene compound. Examples of the optional monomer component may include an aromatic vinyl compound and an optional unsaturated compound. The amount of the optional monomer component is preferably 30% by weight or less, more preferably 20% by weight or less, and particularly preferably 10% by weight or less, relative to the monomer composition (b).

As a method for polymerizing the monomer composition to obtain the respective polymer blocks, for example, radical polymerization, anionic polymerization, cationic polymerization, coordinated anionic polymerization, and coordinated cationic polymerization may be used. From the viewpoint of facilitating the polymerization operation and the hydrogenation reaction in the post-process, a method for performing radical polymerization, anionic polymerization, cationic polymerization, and the like by living polymerization is preferable, and a method of performing living anionic polymerization is particularly preferable.

The polymerization may be performed in the presence of a polymerization initiator. Examples of the polymerization initiators in living anionic polymerization may include monoorganolithium such as n-butyllithium, sec-butyllithium, t-butyllithium, hexyllithium, and phenyllithium; and a polyfunctional organolithium compound such as dilithiomethane, 1,4-dilithiobutane, and 1,4-dilithio-2-ethylcyclohexane. As these initiators, one type thereof may be solely used, and two or more types thereof may be used in combination at any ratio.

The polymerization temperature is preferably 0° C. or higher, more preferably 10° C. or higher, and particularly preferably 20° C. or higher, and is preferably 100° C. or lower, more preferably 80° C. or lower, and particularly preferably 70° C. or lower.

As the mode of the polymerization reaction, for example, solution polymerization and slurry polymerization may be used. Among these, when solution polymerization is used, the reaction heat can be easily removed.

When solution polymerization is performed, an inert solvent in which the polymer obtained in each step can be dissolved may be used as the solvent. Examples of the inert solvent may include an aliphatic hydrocarbon solvent such as n-butane, n-pentane, isopentane, n-hexane, n-heptane, and isooctane; an alicyclic hydrocarbon solvent such as cyclopentane, cyclohexane, methylcyclopentane, methylcyclohexane, decalin, bicyclo[4.3.0]nonane, and tricyclo [4.3.0.1$^{2,5}$]decane; and an aromatic hydrocarbon solvent such as benzene and toluene. As these inert solvents, one type thereof may be solely used, and two or more types thereof may be used in combination at any ratio. Among these, the use of an alicyclic hydrocarbon solvent as a solvent is preferable because it can be used as it is as an inert solvent in the hydrogenation reaction and the solubility of the block copolymer [1] therein is good. The amount of the solvent used is preferably 200 parts by weight to 2000 parts by weight, relative to 100 parts by weight of the total monomer used.

When each monomer composition includes two or more types of monomers, a randomizer may be used in order to suppress lengthening of only one component chain. In particular, when the polymerization reaction is performed by anionic polymerization, it is preferable to use, for example, a Lewis base compound as a randomizer. Examples of the Lewis base compound may include an ether compound such as dimethyl ether, diethyl ether, diisopropyl ether, dibutyl ether, tetrahydrofuran, diphenyl ether, ethylene glycol diethyl ether, and ethylene glycol methyl phenyl ether; a tertiary amine compound such as tetramethylethylenediamine, trimethylamine, triethylamine, and pyridine; an alkali metal alkoxide compound such as potassium-t-amyl oxide and potassium-t-butyl oxide; and a phosphine compound such as triphenylphosphine. As these compounds, one type thereof may be solely used, and two or more types thereof may be used in combination at any ratio.

(Hydrogenated Product [2])

The hydrogenated product [2] is a polymer having a structure formed by hydrogenating unsaturated bonds of the block copolymer [1]. Herein, the unsaturated bonds of the block copolymer [1] to be hydrogenated include both the carbon-carbon unsaturated bonds of the main chain and the side chain of the block copolymer [1] and the carbon-carbon unsaturated bonds of the aromatic ring thereof.

The hydrogenation rate is preferably 90% or more, more preferably 97% or more, and particularly preferably 99% or more of the carbon-carbon unsaturated bonds of the main chain and the side chain of the block copolymer [1] and the carbon-carbon unsaturated bonds of the aromatic ring thereof. With high hydrogenation rate, better transparency, heat resistance, and weather resistance of the A layer can be achieved, and furthermore, birefringence of the A layer can be easily reduced. Herein, the hydrogenation rate of the hydrogenated product [2] may be obtained by $^1$H-NMR measurement.

In particular, the hydrogenation rate of the carbon-carbon unsaturated bonds of the main chain and the side chain is preferably 95% or more, and more preferably 99% or more. When the hydrogenation rate of the carbon-carbon unsaturated bonds of the main chain and the side chain is increased, light resistance and oxidation resistance of the A layer can be further increased.

The hydrogenation rate of the carbon-carbon unsaturated bonds of the aromatic ring is preferably 90% or more, more preferably 93% or more, and particularly preferably 95% or more. When the hydrogenation rate of the carbon-carbon unsaturated bonds of the aromatic ring is increased, the polymer block obtained by hydrogenating the polymer block [C] can have high glass transition temperature, so that heat resistance of the A layer can be effectively increased.

The weight-average molecular weight (Mw) of the hydrogenated product [2] is preferably 40,000 or more, more preferably 50,000 or more, and particularly preferably 60,000 or more, and is preferably 200,000 or less, more preferably 150,000 or less, and particularly preferably 100,000 or less. When the weight-average molecular weight (Mw) of the hydrogenated product [2] falls within the aforementioned range, mechanical strength and heat resistance of the A layer can be improved, and furthermore, birefringence of the A layer can be easily reduced.

The molecular weight distribution (Mw/Mn) of the hydrogenated product [2] is preferably 3 or less, more preferably 2 or less, and particularly preferably 1.5 or less, and is preferably 1.0 or more. When the molecular weight distribution (Mw/Mn) of the hydrogenated product [2] falls within the aforementioned range, mechanical strength and heat resistance of the A layer can be improved, and further, birefringence of the A layer can be easily reduced.

The weight-average molecular weight (Mw) and the molecular weight distribution (Mw/Mn) of the hydrogenated product [2] may be determined as a polystyrene-equivalent value by gel permeation chromatography (GPC) using tetrahydrofuran as a solvent.

The aforementioned hydrogenated product [2] may be produced by hydrogenating the block copolymer [1]. As the hydrogenation method, a hydrogenation method capable of achieving a high hydrogenation rate and causing a less chain scission reaction of the block copolymer [1] is preferable. Examples of such hydrogenation methods may include the methods described in International Publication No. 2011/096389 and International Publication No. 2012/043708.

Specific examples of the hydrogenation methods may include a method for performing hydrogenation using a hydrogenation catalyst containing at least one metal selected from the group consisting of nickel, cobalt, iron, rhodium, palladium, platinum, ruthenium, and rhenium. As the hydrogenation catalysts, one type thereof may be solely used, and two or more types thereof may be used in combination at any ratio. As the hydrogenation catalyst, either a heterogeneous catalyst or a homogeneous catalyst may be used. The hydrogenation reaction is preferably performed in an organic solvent.

(Alkoxysilyl-Group Modified Product [3])

The alkoxysilyl-group modified product [3] is a polymer having a structure formed by introducing an alkoxysilyl group into the aforementioned hydrogenated product [2] of the block copolymer [1]. However, the alkoxysilyl-group modified product [3] is not limited by its producing method.

The alkoxysilyl group may be bonded directly to the aforementioned hydrogenated product [2], or may be bonded indirectly thereto via a divalent organic group such as an alkylene group, for example. The alkoxysilyl-group modified product [3] into which an alkoxysilyl group has been introduced is particularly excellent in adhesiveness to an inorganic material such as glass or metal. Therefore, the A layer is usually excellent in adhesiveness to the aforementioned inorganic material.

The amount of the alkoxysilyl group introduced in the alkoxysilyl-group modified product [3] is preferably 0.1 part by weight or more, more preferably 0.2 part by weight or more, and particularly preferably 0.3 part by weight or more, and is preferably 10 parts by weight or less, more preferably 5 parts by weight or less, and particularly preferably 3 parts by weight or less, relative to 100 parts by weight of the hydrogenated product [2] before the introduction of the alkoxysilyl group. When the amount of the alkoxysilyl group introduced falls within the aforementioned range, it is possible to prevent the degree of cross-linking between the alkoxysilyl groups decomposed by moisture or the like from becoming excessively high, so that the adhesiveness of the A layer to the inorganic material can be maintained high.

The amount of the alkoxysilyl group introduced may be measured with $^1$H-NMR spectrometry. When the amount of the alkoxysilyl group introduced is small, the measurement thereof may be performed with an increased number of times of integration.

The alkoxysilyl-group modified product [3] may be produced by introducing an alkoxysilyl group into the hydrogenated product [2] of the block copolymer [1] described above. Examples of the method for introducing an alkoxysilyl group into the hydrogenated product [2] may include a method for reacting the hydrogenated product [2] with an ethylenically unsaturated silane compound in the presence of a peroxide.

As the ethylenically unsaturated silane compound, a compound capable of performing graft polymerization with the hydrogenated product [2] and introducing an alkoxysilyl group into the hydrogenated product [2] may be used. Examples of such ethylenically unsaturated silane compounds may include an alkoxysilane having a vinyl group such as vinyltrimethoxysilane, vinyltriethoxysilane, dimethoxymethylvinylsilane, and diethoxymethylvinylsilane; an alkoxysilane having an allyl group such as allyltrimethoxysilane and allyltriethoxysilane; an alkoxysilane having a p-styryl group such as p-styryltrimethoxysilane and p-styryltriethoxysilane; an alkoxysilane having a 3-methacryloxypropyl group such as 3-methacryloxypropyltrimethoxysilane, 3-methacryloxypropylmethyldimethoxysilane, 3-methacryloxypropyltriethoxysilane, and 3-methacryloxypropylmethyldiethoxysilane; an alkoxysilane having a 3-acryloxypropyl group such as 3-acryloxypropyltrimethoxysilane and 3-acryloxypropyltriethoxysilane; and an alkoxysilane having a 2-norbornene-5-yl group such as 2-norbornene-5-yl trimethoxysilane. Among these, vinyltrimethoxysilane, vinyltriethoxysilane, dimethoxymethylvinylsilane, diethoxymethylvinylsilane, allyltrimethoxysilane, allyltriethoxysilane, and p-styryltrimethoxysilane are preferable because the advantageous effects of the present invention can be more easily obtained. As the ethylenically unsaturated silane compounds, one type thereof may be solely used, and two or more types thereof may be used in combination at any ratio.

The amount of the ethylenically unsaturated silane compound is preferably 0.1 part by weight or more, more preferably 0.2 part by weight or more, and particularly preferably 0.3 part by weight or more, and is preferably 10 parts by weight or less, more preferably 5 parts by weight or less, and particularly preferably 3 parts by weight or less, relative to 100 parts by weight of the hydrogenated product [2] before introducing the alkoxysilyl group.

In the resin constituting the A layer, the ratio of the hydrogenated product [2] or alkoxysilyl-group modified product [3] is preferably 80% by weight to 100% by weight, more preferably 90% by weight to 100% by weight, and particularly preferably 95% by weight to 100% by weight.

(Properties of Thermoplastic Resin [A])

The tensile elongation at break Sa of the 1.5 mm-thick film (a1) formed of the thermoplastic resin [A] usually satisfies the following formula (2).

$$Sa \geq 100\% \tag{2}$$

This can improve bend resistance of the optical layered film.

The tensile elongation at break Sa is usually 100% or more, preferably 200% or more, and more preferably 300% or more. The tensile elongation at break Sa may usually be 1000% or less.

The tensile elongation at break Sa and the below-mentioned tensile elongation at break Sb may be measured in accordance with JIS K7127.

It is preferable that the modulus of elasticity in flexure Ea of a 4 mm-thick film (a2) formed of the thermoplastic resin [A] satisfies the following formula (3).

$$300 \text{ MPa} \leq Ea \leq 900 \text{ MPa} \tag{3}$$

The modulus of elasticity in flexure Ea is preferably 300 MPa or more, and more preferably 350 MPa or more, and is preferably 900 MPa or less, and more preferably 850 MPa or less.

This can make the A layer flexible and improve bend resistance of the optical layered film.

The modulus of elasticity in flexure Ea and the below-mentioned modulus of elasticity in flexure Eb may be measured in accordance with JIS K7171.

(Optional Component Other than Thermoplastic Resin [A])

The A layer may include an optional component other than the thermoplastic resin [A]. Examples of the optional components may include liquid paraffin such as hydrogenated polybutene.

The optional component other than the thermoplastic resin [A] in the A layer is preferably 45% by weight or less, and more preferably 40% by weight or less. The optional component other than the thermoplastic resin [A] in the A layer may be 0% by weight or more.

(1.2. B Layer)

The B layer is formed of a thermoplastic resin [B], and preferably consists only of the thermoplastic resin [B].

(Thermoplastic Resin [B])

The thermoplastic resin [B] usually includes a thermoplastic polymer, and further includes an optional component, if necessary.

The containing ratio of the thermoplastic polymer in the thermoplastic resin [B] is preferably 55% by weight or more, more preferably 60% by weight or more, and still more preferably 65% by weight or more, relative to the total weight of the thermoplastic resin [B]. The containing ratio of the thermoplastic polymer in the thermoplastic resin [B] may be 100% by weight or less.

Examples of the polymer included in the thermoplastic resin [B] may include polymers mentioned as the polymers included in the thermoplastic resin [A].

The thermoplastic resin [B] preferably includes a polymer containing an alicyclic structure (also referred to as an alicyclic ring structure) in terms of excellent mechanical properties, heat resistance, transparency, low hygroscopicity, low moisture permeability, size stability, and light-weight property.

The polymer containing an alicyclic structure is a polymer of which the structural unit includes an alicyclic structure.

The polymer containing an alicyclic structure may contain an alicyclic structure in a main chain, in a side chain, or in both main chain and side chain. Among these, a polymer containing an alicyclic structure in at least a main chain is preferable from the viewpoints of mechanical strength and heat resistance.

Examples of the alicyclic structure may include a saturated alicyclic hydrocarbon (cycloalkane) structure, and an unsaturated alicyclic hydrocarbon (cycloalkene, cycloalkyne) structure. Among these, the cycloalkane structure and the cycloalkene structure are preferable from the viewpoints of mechanical strength and heat resistance, and the cycloalkane structure is particularly preferable among them.

The number of carbon atoms constituting the alicyclic structure is preferably 4 or more, and more preferably 5 or more, and is preferably 30 or less, more preferably 20 or less, and particularly preferably 15 or less, per one alicyclic structure. When the number of carbon atoms constituting the alicyclic structure falls within this range, mechanical strength, heat resistance, and moldability of the resin including the polymer containing an alicyclic structure are highly balanced.

In the polymer containing an alicyclic structure, the ratio of the structural unit having an alicyclic structure may be appropriately selected according to the purpose of use.

Examples of the polymer containing an alicyclic structure may include a norbornene-based polymer, a monocyclic olefin-based polymer, a cyclic conjugated diene-based polymer, a vinyl alicyclic hydrocarbon polymer, and hydrogenated products of these. Among these, a norbornene-based polymer is more preferable because of their good transparency and moldability.

Examples of the norbornene-based polymer may include a ring-opening polymer of a monomer having a norbornene structure and a hydrogenated product thereof; and an addition polymer of a monomer having a norbornene structure and a hydrogenated product thereof. Examples of the ring-opening polymer of a monomer having a norbornene structure may include a ring-opening homopolymer of one type of monomer having a norbornene structure, a ring-opening copolymer of two or more types of monomers having a norbornene structure, and a ring-opening copolymer of a monomer having a norbornene structure and an optional monomer copolymerizable therewith. Examples of the addition polymer of a monomer having a norbornene structure may include an addition homopolymer of one type of monomer having a norbornene structure, an addition copolymer of two or more types of monomers having a norbornene structure, and an addition copolymer of a monomer having a norbornene structure and an optional monomer copolymerizable therewith. Among these, a hydrogenated product of a ring-opening polymer of a monomer having a norbornene structure is particularly suitable from the viewpoints of moldability, heat resistance, low hygroscopicity, low moisture permeability, size stability, and light-weight property.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$] deca-3-ene (common name: methanotetrahydrofluorene), tetracyclo[4.4.0.1$^{2,5}$.1$^{7,10}$]dodeca-3-ene (common name: tetracyclododecene), and derivatives of these compounds (for example, those with a substituent on the ring). Examples of the substituent may include an alkyl group, an alkylene group, and a polar group. A plurality of these substituents that are the same as or different from each other may be bonded to a ring. As the monomer having a norbornene structure, one type thereof may be solely used, and two or more types thereof may be used in combination at any ratio.

Examples of the type of the polar group may include a heteroatom and an atomic group having a heteroatom. Examples of the heteroatom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, a nitrile group, and a sulfonic acid group.

Examples of the monomer that is ring-opening copolymerizable with the monomer having a norbornene structure may include monocyclic olefins such as cyclohexene, cycloheptene, and cyclooctene, and derivatives thereof; cyclic conjugated dienes such as cyclohexadiene and cycloheptadiene, and derivatives thereof. As the monomer that is ring-opening copolymerizable with the monomer having a norbornene structure, one type thereof may be solely used, and two or more types thereof may be used in combination at any ratio.

The ring-opening polymer of the monomer having a norbornene structure may be produced, for example, by polymerizing or copolymerizing the monomer in the presence of a ring-opening polymerization catalyst.

Examples of the monomer that is addition copolymerizable with the monomer having a norbornene structure may include α-olefins of 2 to 20 carbon atoms such as ethylene, propylene, and 1-butene, and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Among these, α-olefin is preferable, and ethylene is more preferable. As the monomer that is addition copolymerizable with the monomer having a norbornene structure, one type thereof may be solely used, and two or more types thereof may be used in combination at any ratio.

The addition polymer of the monomer having a norbornene structure may be produced, for example, by polymerizing or copolymerizing the monomer in the presence of an addition polymerization catalyst.

The aforementioned hydrogenated products of the ring-opening polymer and the addition polymer may be produced, for example, by hydrogenating carbon-carbon unsaturated bonds, preferably 90% or more thereof, in a solution of the ring-opening polymer and the addition polymer in the presence of a hydrogenation catalyst containing a transition metal such as nickel and palladium.

The polymer containing an alicyclic structure described above may be crystallizable or non-crystallizable.

The crystallizable polymer means a polymer having a melting point, i.e. a polymer of which the melting point can be measured by differential scanning calorimetry (DSC).

When the polymer containing an alicyclic structure is crystallizable, the melting point of the polymer is preferably 200° C. or higher, and more preferably 230° C. or higher, and is preferably 290° C. or lower. The resin [B] that includes the polymer containing an alicyclic structure having such a melting point can form the B layer having excellent balance between moldability and heat resistance.

In the resin constituting the B layer, the ratio of the polymer containing an alicyclic structure described above is preferably 80% by weight to 100% by weight, more preferably 90% by weight to 100% by weight, and particularly preferably 95% by weight to 100% by weight.

(Properties of Thermoplastic Resin [B])

The modulus of elasticity in flexure Eb of a 4 mm-thick film (b) formed of the thermoplastic resin [B] preferably satisfies the following formula (4).

$$2200 \text{ MPa} \leq Eb \leq 2800 \text{ MPa} \tag{4}$$

The modulus of elasticity in flexure Eb is preferably 2200 MPa or more, and more preferably 2250 MPa or more, and is preferably 2800 MPa or less, and more preferably 2700 MPa or less.

(Properties of B Layer)

The thickness-direction retardation Rthb of the B layer usually satisfies the following formula (1).

$$|Rthb| \leq 40 \text{ nm} \tag{1}$$

The absolute value (|Rthb|) of the retardation Rthb is usually 0 nm or more, and is usually 40 nm or less, preferably 30 nm or less, and more preferably 20 nm or less.

The feature can suppress occurrence of iridescent unevenness when the optical layered film is used together with the image display element.

The tensile elongation at break Sb of the B layer preferably satisfies the following formula (5).

$$5\% \leq Sb \leq 60\% \tag{5}$$

Even when the tensile elongation at break Sb of the layer is relatively small as described above, the bend resistance can be improved by layering the A layer.

The tensile elongation at break Sb is preferably 5% or more, and more preferably 6% or more, and is preferably 60% or less, and more preferably 58% or less.

(1.3. Optional Layer)

The optical layered film may include an optional layer in addition to the A layer and the B layer depending on the purpose of use of the optical layered film. Examples of the optional layer may include an index-matching layer and a hard coat layer.

(1.4. Examples of Configuration of Optical Layered Film)

Examples of the configuration of the optical layered film will be described below with reference to the drawings. The present invention is not limited by these exemplary configurations and may include an additional component, if necessary. For example, the optical layered film may include a functional layer such as an index-matching layer or a hard coat layer as the additional component.

Embodiment F-1 of Optical Layered Film

In Embodiment F-1 of an optical layered film, an A layer is provided on one surface of a B layer.

FIG. 1 is a cross-sectional view schematically illustrating Embodiment F-1 of the optical layered film.

As illustrated in FIG. 1, an optical layered film 100 includes an A layer 101 and a B layer 102. The B layer 102 has a surface 102U and a surface 102D, and the A layer 101 is provided directly on one surface 102U of the B layer 102.

Embodiment F-2 of Optical Layered Film

In Embodiment F-2 of an optical layered film, the optical layered film includes two A layers, and each of the A layers is provided on each of both surfaces of the B layer.

Figure 2:
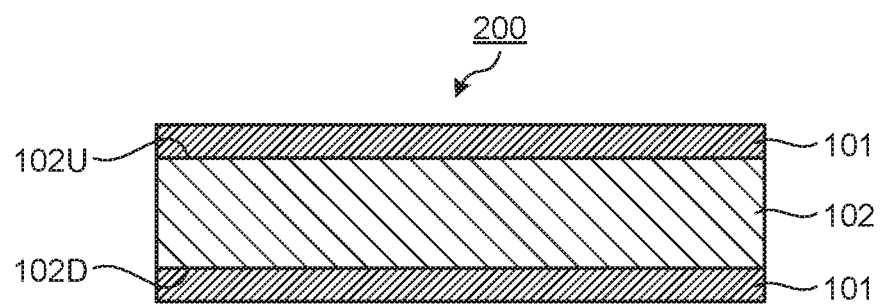
FIG. 2 is a cross-sectional view schematically illustrating Embodiment F-2 of an optical layered film.

FIG. 2 is a cross-sectional view schematically illustrating Embodiment F-2 of the optical layered film.

As illustrated in FIG. 2, an optical layered film 200 includes the A layer 101, the B layer 102, and the A layer 101 in this order, and each of the two A layers 101 and 101 is provided directly on the surface 102U or the surface 102D.

(1.5. Method for Producing Optical Layered Film)

The optical layered film may be produced by any method. Examples of the methods may include a method including forming the A layer and the B layer separately and layering the layers and a method including producing the A layer and the B layer simultaneously in a process such as a coextrusion process or a co-casting process, thereby obtaining a layered film.

Examples of the method for forming the A layer or the B layer may include a melt extrusion method and a method including applying a solution containing a material for the A layer or the B layer and a solvent onto a supporting film whose surface has been subjected to a releasing treatment to form an applied layer and then removing the solvent from the applied layer, thereby obtaining the A layer or the B layer with the supporting film.

Examples of the method for layering the A layer and the B layer that have been formed separately may include a method including pressing the A layer and the B layer while heating to bond the layers together and a method including bonding the A layer and the B layer together via an adhesive layer.

When the A layer and the B layer are layered, a surface treatment such as a corona treatment may be performed on the surface of the A layer or the B layer.

When a layered film is produced from the A layer or the B layer with the supporting film, the supporting film may be removed before layering the A layer and the B layer, thereby obtaining an optical layered film. Alternatively, the A layer or the B layer with the supporting film may be layered as it is to obtain a layered body and then the supporting film may be removed from the layered body, thereby obtaining an optical layered film.

(1.6. Use Applications of Optical Layered Film)

The optical layered film of the present invention may be used for various optical applications. For example, the optical layered film of the present invention may be used as a member of a touch panel.

Since the optical layered film of the present invention has good bend resistance, the optical layered film can be combined particularly with a flexible image display element (flexible display element) to form a flexible device such as a flexible touch panel.

(2. Touch Panel)

The touch panel of the present invention includes a touch sensor member and an image display element.

The touch sensor member includes a first electroconductive layer, the above-described optical layered film, and a second electroconductive layer in this order. The touch sensor member is provided on a viewing side of the image display element.

The touch sensor member may be a member obtained by forming the second electroconductive layer on the above-described optical layered film and bonding the optical layered film with the second electroconductive layer formed thereon onto the first electroconductive layer via a dielectric material. Alternatively, the touch sensor member may be a member obtained by bonding the second electroconductive layer formed on a separate substrate (for example, a glass substrate or a film substrate) onto a layered body, which includes the first electroconductive layer and the above-described optical layered film, via a dielectric material.

The first electroconductive layer and/or the second electroconductive layer may be a layer obtained by transferring an electroconductive layer formed on a separate substrate onto the above-described optical layered film.

(2.1. Image Display Element)

Any image display element may be used as the image display element. Examples thereof may include a liquid crystal display element and an organic electroluminescent (organic EL) display element. Elements that may be used as the image display element are as follows: an element having a configuration that can be bent with the surface on the viewing side of the image display element being inner side, an element having a configuration that can be bent with the surface on the viewing side of the image display element being outer side, and an element having a configuration that can be bent with the surface on the viewing side of the image display element being inner side and the surface on the viewing side of the image display element being outer side.

The image display element is preferably an image display element with flexibility.

(2.2. Electroconductive Layer)

The first electroconductive layer and the second electroconductive layer are layers with electroconductivity. The layer with electroconductivity is usually formed as a layer including a material with electroconductivity (electroconductive material). Examples of the electroconductive material may include a metal, an electroconductive metal oxide, an electroconductive nanowire, and an electroconductive polymer. As the electroconductive material, one type thereof may be solely used, and two or more types thereof may be used in combination at any ratio.

The planar shape of the electroconductive layer is preferably a pattern that works well as the touch panel (for example, a capacitive touch panel). Specific examples thereof may include patterns described in Japanese Translation of PCT International Application Publication No. 2011-511357 A, Japanese Patent Application Laid-Open No. 2010-164938 A, Japanese Patent Application Laid-Open No. 2008-310550 A, Japanese Translation of PCT International Application Publication No. 2003-511799 A, and Japanese Translation of PCT International Application Publication No. 2010-541109 A.

The electroconductive layer preferably has high transparency.

(2.3. Example of Configuration of Touch Panel)

Examples of the configuration of the touch panel are described below with reference to the drawings. The present invention is not limited by these exemplary configurations and may include an additional component, if necessary. For example, a functional layer such as an index-matching layer or a hard coat layer may be included as the additional component.

Embodiment p-1 of Touch Panel

In Embodiment P-1 of a touch panel, the touch panel includes a touch sensor member and an image display element. The touch sensor member includes a first electroconductive layer, an optical layered film, and a second electroconductive layer in this order. The touch sensor member is provided on a viewing side of the image display element, and the touch sensor member is disposed such that the surface on the aforementioned viewing side of the image display element faces the surface on the A layer side of the optical layered film.

Figure 3:
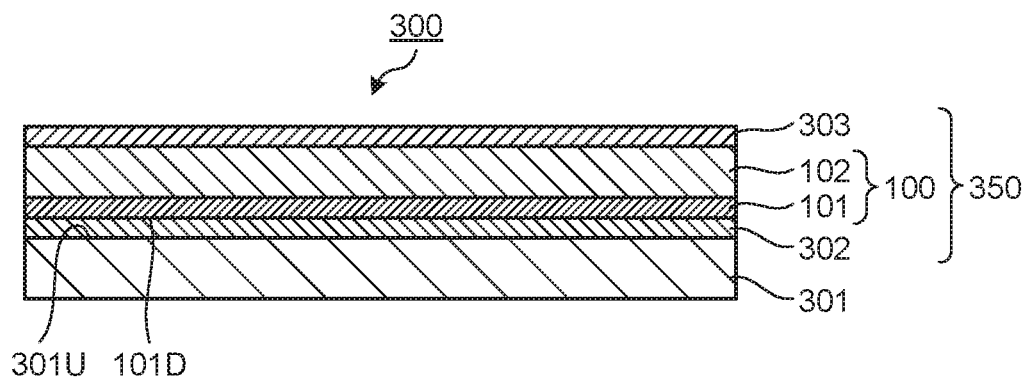
FIG. 3 is a cross-sectional view schematically illustrating Embodiment P-1 of a touch panel.

FIG. 3 is a cross-sectional view schematically illustrating Embodiment P-1 of the touch panel.

As illustrated in FIG. 3, a touch panel 300 includes an image display element 301 and a touch panel member 350. The touch panel member 350 is provided directly on a surface 301U on the viewing side of the image display element 301. The touch panel member 350 includes an electroconductive layer 302, the optical layered film 100, and an electroconductive layer 303 in this order. The optical layered film 100 includes the B layer 102 and the A layer 101 directly provided on one surface of the B layer 102. The surface 101D on the A layer 101 side of the optical layered film 100 faces a surface 301U on the viewing side of the image display element 301.

Embodiment P-2 of Touch Panel

In Embodiment P-2 of the touch panel, the touch panel includes the touch sensor member and the image display element. Embodiment P-2 is the same as Embodiment P-1 in that the touch sensor member includes the first electroconductive layer, the optical layered film, and the second electroconductive layer in this order and the touch sensor member is provided on the viewing side of the image display element. However, Embodiment P-2 is different from Embodiment P-1 in that the touch sensor member is disposed such that the surface on the viewing side of the image display element faces the surface on the B layer side of the optical layered film.

Figure 4:
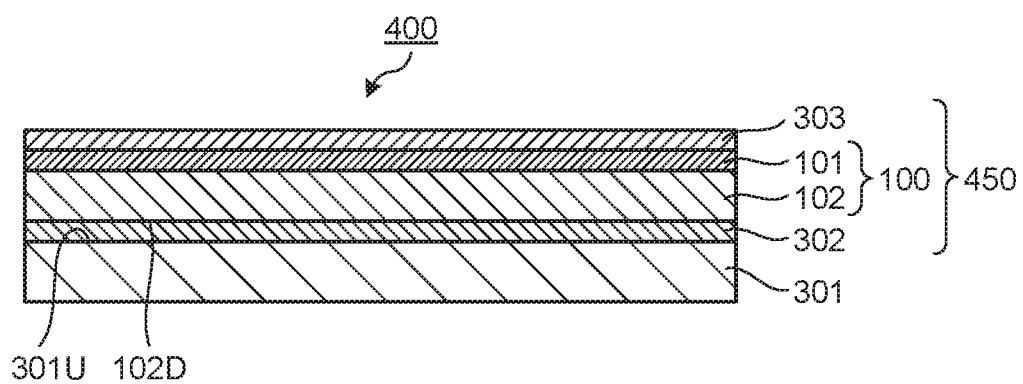
FIG. 4 is a cross-sectional view schematically illustrating Embodiment P-2 of a touch panel.

FIG. 4 is a cross-sectional view schematically illustrating Embodiment P-2 of the touch panel.

As illustrated in FIG. 4, a touch panel 400 includes the image display element 301 and a touch panel member 450. The touch panel member 450 is provided directly on the surface 301U on the viewing side of the image display element 301. The touch panel member 450 includes the electroconductive layer 302, the optical layered film 100, and the electroconductive layer 303 in this order. The surface 102D on the B layer 102 side of the optical layered film 100 faces the surface 301U on the viewing side of the image display element 301.

Embodiment P-3 of Touch Panel

In Embodiment P-3 of the touch panel, the touch panel includes the touch sensor member and the image display element, and the touch sensor member includes, as the optical layered film, a film that includes two A layers, the A layers being provided on both surfaces of the B layer.

Figure 5:
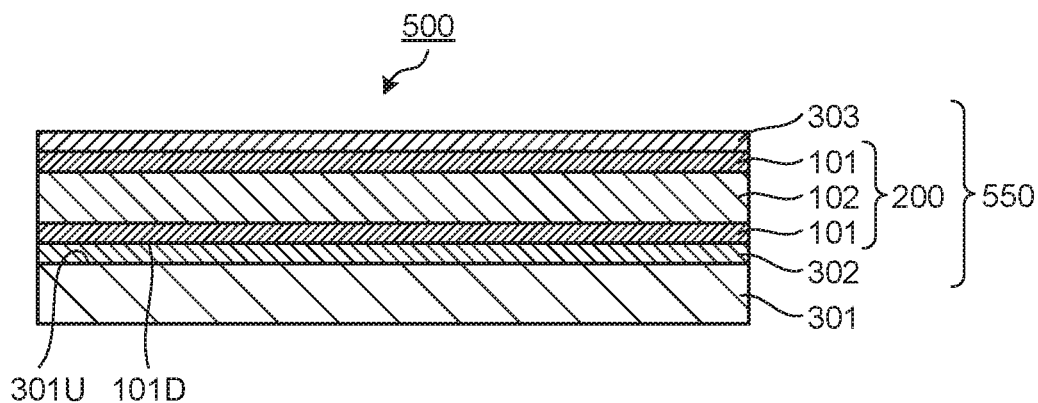
FIG. 5 is a cross-sectional view schematically illustrating Embodiment P-3 of a touch panel.

FIG. 5 is a cross-sectional view schematically illustrating Embodiment P-3 of the touch panel.

As illustrated in FIG. 5, a touch panel 500 includes the image display element 301 and a touch panel member 550. The touch panel member 550 is provided directly on the surface 301U on the viewing side of the image display element 301. The touch panel member 550 includes the electroconductive layer 302, the optical layered film 200, and the electroconductive layer 303 in this order. The surface 101D on one side of the optical layered film 200 faces the surface 301U on the viewing side of the image display element 301.

Embodiment P-4 of Touch Panel

In Embodiment P-4 of the touch panel, the touch panel includes the touch sensor member and the image display element, and the image display element is an element having a configuration that can be bent with the surface on the viewing side thereof being inner side. The touch sensor member is disposed such that the surface on the viewing side of the image display element faces the surface on the A layer side of the optical layered film included in the touch sensor member.

Figure 6:
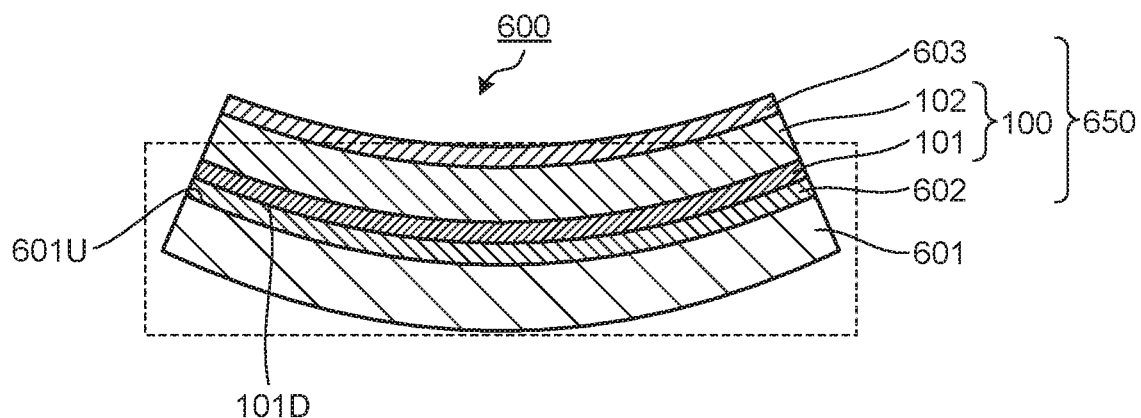
FIG. 6 is a cross-sectional view schematically illustrating Embodiment P-4 of a touch panel.

FIG. 6 is a cross-sectional view schematically illustrating Embodiment P-4 of the touch panel.

As illustrated in FIG. 6, a touch panel 600 includes an image display element 601 and a touch panel member 650. The touch panel member 650 is provided directly on a surface 601U on the viewing side of the image display element 601.

The image display element 601 has a configuration that can be bent with the surface 601U on the viewing side thereof being inner side. The touch panel member 650 is configured to have flexibility. Therefore, the touch panel 600 can also be bent with the surface 601U on the viewing side of the image display element 601 being inner side. The shape represented by a solid line in FIG. 6 schematically illustrates the shape of the touch panel 600 when the panel is bent, and the shape represented by a broken line schematically illustrates the shape of the touch panel 600 before the panel is bent.

The touch panel member 650 includes an electroconductive layer 602, the optical layered film 100, and an electroconductive layer 603 in this order. The surface 101D on the A layer 101 side of the optical layered film 100 faces the surface 601U on the viewing side of the image display element 601.

In this embodiment, when the touch panel 600 is bent with the surface 601U on the viewing side of the image display element 601 being inner side, tensile stress is applied to the A layer 101 included in the optical layered film 100. In the optical layered film 100, development of cracks is suppressed even when bending was repeated so that tensile stress was applied to the A layer 101 repeatedly. Thus, the touch panel 600 is excellent in bend resistance.

Embodiment P-5 of Touch Panel

In Embodiment P-5 of the touch panel, the touch panel includes the touch sensor member and the image display element, and the image display element is an element having a configuration that can be bent with the surface on the viewing side thereof being outer side. The touch sensor member is disposed such that the surface on the viewing side of the image display element faces the surface on the B layer side of the optical layered film included in the touch sensor member.

Figure 7:
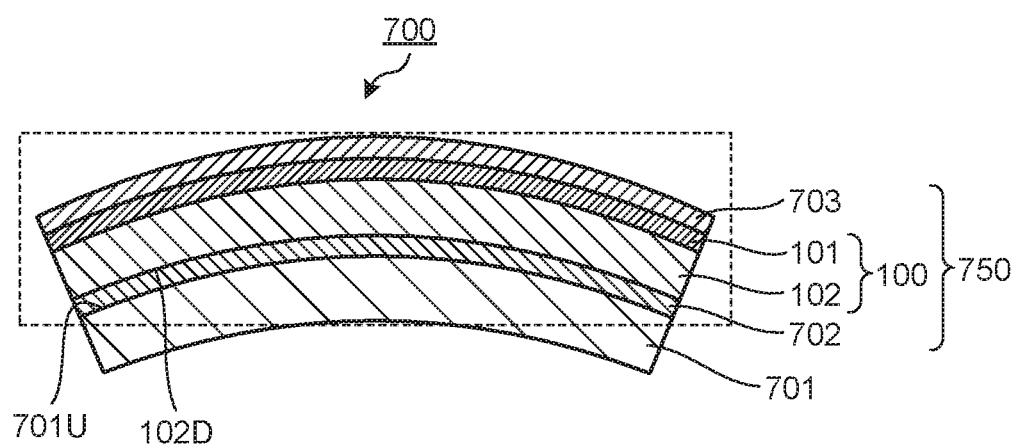
FIG. 7 is a cross-sectional view schematically illustrating Embodiment P-5 of a touch panel.

FIG. 7 is a cross-sectional view schematically illustrating Embodiment P-5 of the touch panel.

As illustrated in FIG. 7, a touch panel 700 includes an image display element 701 and a touch panel member 750. The touch panel member 750 is provided directly on a surface 701U on the viewing side of the image display element 701.

The image display element 701 has a configuration that can be bent with the surface 701U on the viewing side thereof being outer side. The touch panel member 750 is configured to have flexibility. Therefore, the touch panel 700 can also be bent with the surface 701U on the viewing side of the image display element 701 being outer side. The shape represented by a solid line in FIG. 7 schematically illustrates the shape of the touch panel 700 when the panel is bent, and the shape represented by a broken line schematically illustrates the shape of the touch panel 700 before the panel is bent.

The touch panel member 750 includes an electroconductive layer 702, the optical layered film 100, and an electroconductive layer 703 in this order. The surface 102D on the B layer 102 side of the optical layered film 100 faces the surface 701U on the viewing side of the image display element 701.

In this embodiment, when the touch panel 700 is bent with the surface 701U on the viewing side of the image display element 701 being outer side, tensile stress is applied to the A layer 101 included in the optical layered film 100. In the optical layered film 100, development of cracks is suppressed even when bending was repeated so that tensile stress was applied to the A layer 101 repeatedly. Thus, the touch panel 700 is excellent in bend resistance.

EXAMPLES

Hereinafter, the present invention will be specifically described by illustrating Examples. However, the present invention is not limited to the Examples described below. The present invention may be freely modified for implementation without departing from the scope of claims of the present invention and the scope of their equivalents.

In the following description, "%" and "part" representing quantity are on the basis of weight, unless otherwise specified. The following operations were performed under the conditions of normal temperature and normal pressure, unless otherwise specified.

(Evaluation Method)
(Method for Measuring Thickness-Direction Retardation Rth)

A device for measuring a retardation (product name: "Axoscan", manufactured by Axometric, Co.) was used to measure Rth at a wavelength of 590 nm. Rth is a value calculated by the following formula.

$$Rth = \{(nx+ny)/2 - nz\} \times d$$

(Method for Measuring Thickness)

The thickness of the measurement subject film was measured at randomly-selected four locations by using a snap gauge (manufactured by Mitutoyo Corporation) and the average thereof was adopted as the film thickness.

(Method for Measuring Weight-Average Molecular Weight and Number-Average Molecular Weight)

The weight-average molecular weight and the number-average molecular weight of polymers were measured as a polystyrene-equivalent value by using a gel permeation chromatography (GPC) system ("HLC-8320" manufactured by Tosoh Corporation). For measurement, an H type column (manufactured by Tosoh Corporation) was used as a column and tetrahydrofuran was used as a solvent. The temperature during measurement was 40° C.

(Method for Measuring Polymerization Conversion Rate)

The polymerization conversion rate during synthesis of polymers was measured by GPC.

(Method for Measuring Hydrogenation Rate of Hydrogenated Product of Block Copolymer)

The hydrogenation rate of polymers was measured by $^1$H-NMR measurement at 145° C. using orthodichlorobenzene-$d_4$ as a solvent.

(Tensile Elongation at Break)

The tensile elongation at break of the measurement subject film was measured in accordance with JIS K7127. From the measurement subject film, type 1B dumbbell-shape test pieces were punched out and used as measurement samples. Five pieces were punched out along the flow direction (MD direction) of the film in melt extrusion or injection molding. Five pieces were punched out along the width direction of the film (TD direction) orthogonal to the flow direction. Thus 10 pieces in total were punched out from the film as measurement samples. A tensile testing machine equipped with a constant temperature constant humidity chamber ("Model 5564" manufactured by Instron Co.) was used as a measuring apparatus. The measurement was performed at a tension speed of 20 mm/min. The average of tensile elongation values at break for the test pieces punched out along the MD direction (N=5) and the test pieces punched out along the TD direction (N=5) was adopted as the tensile elongation at break of the film.

(Modulus of Elasticity in Flexure)

The modulus of elasticity in flexure of the measurement subject film was measured in accordance with JIS K7171. A 4 mm sheet-shape film was formed from the measurement subject resin by injection molding and this was used as a measurement sample. The tensile testing machine ("Model 5564" manufactured by Instron Co.) was used as a measuring apparatus.

(Bend Resistance Test)

The optical layered films obtained in Examples and Comparative Examples were tested for bend resistance by a tension-free U-shape folding test method for a planar object, using a desktop durability test device ("DLDMLH-FS" manufactured by Yuasa System Co., Ltd.). Bending was repeatedly performed with the A layer (the B layer in the case of a film without the A layer) being outer side (a side to which tensile stress is applied), using the following conditions: an folding stroke of 50 mm, a bend radius of 2 mm, and an folding rate of 80 times/minute. The device was stopped every 1000 times when the number of bending was more than 1000 and not more than 10000, every 5000 times when the number of bending was more than 10000 and not more than 50000, and every 10000 times when the number of bending was more than 50000, to examine the film visually. The case in which the presence of even a slight crack was detected in the film was judged to be "crack", the case in which a fold was detected was judged to be "fold", and the case in which the bent part was cloudy was judged to be "cloudiness". Evaluation tests were performed four times with the upper limit of the number of bending being 100,000 times, and the result of the test in which the number of bending to cause "crack", "fold", or "cloudiness" was largest among the four tests was adopted as the evaluation result.

(Iridescent Unevenness Evaluation)

A commercial on-cell type display panel was prepared, only a touch sensor part was peeled off from the panel, and the optical layered film obtained in each of Examples and Comparative Examples was mounted thereon instead of the touch sensor part. This mounting was carried out such that a slow axis of the optical layered film was parallel to an absorption axis of a polarizing plate of the panel. Subsequently, the display panel was visually observed from the direction defined by an azimuth angle of 45° and a polar angle of 70°, with respect to the slow axis of the polarizing plate being 0°, thereby determining the presence or absence of iridescent unevenness.

Production Example 1

(Production of Hydrogenated Product (a1) of Triblock Copolymer)

25 parts of styrene, 50 parts of isoprene, and 25 parts of styrene were polymerized in this order by referring to the method described in International Publication No. 2014/077267 to produce pellets of a hydrogenated product (a1) of a triblock copolymer (weight-average molecular weight Mw=48,200; molecular weight distribution Mw/Mn=1.04; the hydrogenation rate of carbon-carbon unsaturated bonds in a main chain and a side chain and carbon-carbon unsaturated bonds in an aromatic ring was approximately 100%).

A 4 mm-thick film was formed from the obtained hydrogenated product (a1) by injection molding and the modulus of elasticity in flexure thereof was measured. The modulus of elasticity in flexure was 760 MPa. A 1.5 mm-thick film was formed from the obtained hydrogenated product (a1) by injection molding and the tensile elongation at break thereof was measured. The tensile elongation at break was 520%.

Production Example 2

(Production of Alkoxysilyl-Modified Product (a1-s) of Hydrogenated Product of Triblock Copolymer)

25 parts of styrene, 50 parts of isoprene, and 25 parts of styrene were polymerized in this order by referring to the method described in International Publication No. 2014/077267 to produce the hydrogenated product (a1) of the triblock copolymer (weight-average molecular weight Mw=48,200; molecular weight distribution Mw/Mn=1.04; the hydrogenation rate of carbon-carbon unsaturated bonds in the main chain and the side chain and carbon-carbon unsaturated bonds in an aromatic ring was approximately 100%). Furthermore, by referring to the method described in the aforementioned International Publication No. 2014/077267, 2 parts of vinyltrimethoxysilane were bonded to 100 parts of the aforementioned hydrogenated product (a1) of the triblock copolymer, thereby producing pellets of an alkoxysilyl-modified product (a1-s) of the hydrogenated product of the triblock copolymer.

A 4 mm-thick film was formed from the obtained modified product (a1-s) by injection molding and the modulus of elasticity in flexure thereof was measured. The modulus of elasticity in flexure was 437 MPa. A 1.5 mm-thick film was formed from the obtained modified product (a1-s) by injection molding and the tensile elongation at break thereof was measured. The tensile elongation at break was 520%.

Production Example 3

(Production of Hydrogenated Product (a2) of Block Copolymer)

(P3-1) Production of Block Copolymer

Into a reaction vessel that was equipped with a stirrer and whose interior had been sufficiently replaced by nitrogen, 270 parts of dehydrated cyclohexane, 75 parts of dehydrated styrene, and 7.0 parts of di-n-butyl ether were charged. 5.6 parts of n-butyllithium (15% solution in cyclohexane) was added while stirring the entire content at 60° C., thereby initiating polymerization. The entire content was continuously stirred at 60° C. for 60 minutes. The reaction temperature was kept at 60° C. until the reaction was terminated.

The polymerization conversion rate at this point (first polymerization stage) was 99.4%.

Subsequently, 15 parts of dehydrated isoprene was added to the reaction solution continuously over a period of 40 minutes and stirring was continued for 30 minutes successively after completion of the addition. The polymerization conversion rate at this point (second polymerization stage) was 99.8%.

Subsequently, 10 parts of dehydrated styrene were additionally added to the reaction solution continuously over a period of 30 minutes and stirring was continued for 30 minutes successively after completion of the addition. The polymerization conversion rate at this point (third polymerization stage) was approximately 100%.

At this time, 1.0 part of isopropyl alcohol was added to terminate the reaction, thereby obtaining a polymer solution that included a [C1]-[D]-[C2] type block copolymer (1-1). The resulting block copolymer (1-1) had Mw (1-1) of 82,400, Mw/Mn of 1.32, and wC/wD of 85/15.

(P3-2) Production of Hydrogenated Product (a2) of Block Copolymer

The polymer solution obtained in (P3-1) was transferred to a pressure-resistant reaction vessel equipped with a stirrer, and 4.0 parts of a nickel catalyst supported on diatomaceous earth (product name: "E22U", the containing amount of supported nickel: 60%, manufactured by JGC Catalysts and Chemicals Co.) as a hydrogenation catalyst and 30 parts of dehydrated cyclohexane were added thereto and mixed. The interior of the reaction vessel was replaced by hydrogen gas and hydrogen was further fed while stirring the solution, and hydrogenation reaction was performed at a temperature of 190° C. at a pressure of 4.5 MPa for 6 hours.

The reaction solution obtained by the hydrogenation reaction included a hydrogenated product (a2') of the block copolymer. The hydrogenated product (a2') of the block copolymer had Mw (a2') of 71,800, a molecular weight distribution Mw/Mn of 1.30, and a hydrogenation rate of approximately 100%.

After completion of the hydrogenation reaction, the reaction solution was filtered to remove the hydrogenation catalyst, and then 2.0 parts of xylene solution in which 0.3 part of pentaerythrityl tetrakis[3-(3,5-di-t-butyl-4-hydroxyphenyl)propionate] (product name: "AO60", manufactured by ADEKA Corporation) as a phenol-based antioxidant was dissolved were added and dissolved, thereby obtaining a solution.

Subsequently, the above-described solution was treated using a cylindrical concentration dryer (product name: Kontro, manufactured by Hitachi, Co.) at a temperature of 260° C. at a pressure of 0.001 MPa or lower to remove cyclohexane, xylene, and other volatile components from the solution, thereby obtaining a molten resin. The molten resin was extruded through a die in a strand form, cooled, and shaped into pellets by a pelletizer. In this manner, 95 parts of pellets of the resin (a2) that included the hydrogenated product (a2) of the block copolymer were produced.

The hydrogenated product (a2) of the block copolymer in the obtained resin (a2) had Mw(a2) of 68,500 and Mw/Mn of 1.30.

A 4 mm-thick film was formed from the obtained resin (a2) by injection molding and the modulus of elasticity in flexure thereof was measured. The modulus of elasticity in flexure was 2100 MPa. A 1.5 mm-thick film was formed from the obtained resin (a2) by injection molding and the tensile elongation at break thereof was measured. The tensile elongation at break was 2%.

Example 1

(Production of Optical Layered Film)
(Production of A Layer)

28 g of the pellets of the alkoxysilyl-modified product (a1-s) of the hydrogenated product of the triblock copolymer obtained in Production Example 2, 12 g of hydrogenated polybutene ("PARLEAM (registered trademark) 24" manufactured by NOF CORPORATION), and 60 g of cyclohexane were mixed to dissolve the pellets, thereby preparing a 40% polymer solution. The obtained polymer solution was applied onto a releasing surface of a polyethylene terephthalate (PET) film (50 μm in thickness) for release purpose, with the surface having been subjected to a release treatment. The application thickness of the solution was adjusted such that the thickness of the obtained A layer was 11 After application, the aforementioned film was dried on a hot plate at 110° C. for 30 minutes, thereby forming a layered body having a layer configuration of (release film)/(A layer).

(Production of B Layer)

A cycloolefin polymer film (1) ("ZEONOR Film ZF16" manufactured by ZEON Corporation, which has a modulus of elasticity in flexure of 2500 MPa when the thickness is 4 mm, a tensile elongation at break of 9%, a thickness of 50 μm, and a thickness-direction retardation Rth of 10 nm) was prepared as a B layer formed of a thermoplastic resin B. The surface of the B layer on which the A layer was to be bonded was subjected to a corona treatment with an output that resulted in a water contact angle of 45° or less.

Subsequently, a pressing machine with a press roll heated to 70° C. was prepared, and the B layer and the A layer were bonded such that the corona-treated surface of the B layer faced the A layer, thereby obtaining a layered film having a configuration of (release film)/(A layer)/(B layer). Subsequently, the release film was peeled off to obtain an optical layered film having a configuration of (A layer)/(B layer).

The above-described optical layered film was mounted on an on-cell type display panel to determine the presence or absence of iridescent unevenness.

Bend resistance test was performed on the above-described optical layered film.

The results are shown in Table 1.

Example 2

An optical layered film was obtained and evaluated in the same manner as that of Example 1, except that a cycloolefin polymer film (2) ("ZEONOR Film ZF14" manufactured by ZEON Corporation, which has a modulus of elasticity in flexure of 2350 MPa when the thickness is 4 mm, a tensile elongation at break of 55%, a thickness of 45 μm, and a thickness-direction retardation Rth of 5 nm) was used instead of the cycloolefin polymer film (1) in the (Production of B layer). The results are shown in Table 1.

Example 3

An optical layered film was obtained and evaluated in the same manner as that of Example 1, except that a cycloolefin polymer film (3) ("ZEONOR Film ZF16" manufactured by ZEON Corporation, which has a modulus of elasticity in flexure of 2500 MPa when the thickness is 4 mm, a tensile elongation at break of 21%, a thickness of 35 and a thickness-direction retardation Rth of 10 nm) was used instead of the cycloolefin polymer film (1) in the (Production of B layer). The results are shown in Table 1.

Example 4

An optical layered film having a configuration of (A layer)/(B layer)/(A layer) was obtained and evaluated in the same manner as that of Example 1, except that both surfaces of the B layer were subjected to a corona treatment, and the B layer and two A layers were bonded so as to have a configuration of (release film)/(A layer)/(B layer)/(A layer)/(release film) in the (Production of B layer). The results are shown in Table 1.

Example 5

An optical layered film was obtained and evaluated in the same manner as that of Example 1, except that the pellets of the hydrogenated product (a1) of the triblock copolymer obtained in Production Example 1 were used instead of the pellets of the alkoxysilyl-modified product (a1-s) of the hydrogenated product of the triblock copolymer in the (Production of A layer), and a cycloolefin polymer film (3) ("ZEONOR Film ZF16" manufactured by ZEON Corporation, which has a modulus of elasticity in flexure of 2500 MPa when the thickness is 4 mm, a tensile elongation at break of 21%, a thickness of 35 μm, and a thickness-direction retardation Rth of 10 nm) was used instead of the cycloolefin polymer film (1) in the (Production of B layer). The results are shown in Table 1.

Comparative Example 1

Evaluation was performed in the same manner as that of Example 1 using the cycloolefin polymer film (1) instead of the optical layered film. The results are shown in Table 2.

Comparative Example 2

Evaluation was performed in the same manner as that of Example 1 using the cycloolefin polymer film (2) instead of the optical layered film. The results are shown in Table 2.

Comparative Example 3

An optical layered film was obtained and evaluated in the same manner as that of Example 1, except that the resin (a2) including the hydrogenated product (a2) of the block copolymer was used instead of the pellets of the alkoxysilyl-modified product (a1-s) of the hydrogenated product of the triblock copolymer in the (Production of A layer), and a cycloolefin polymer film (3) was used instead of the cycloolefin polymer film (1) in the (Production of B layer). The results are shown in Table 2.

Comparative Example 4

Evaluation was performed in the same manner as that of Example 1 using a polyethylene terephthalate film ("COSMOSHINE A4100" manufactured by TOYOBO Co., which has a modulus of elasticity in flexure of 5100 MPa when the thickness is 4 mm, a tensile elongation at break of 110%, a thickness of 50 and a thickness-direction retardation Rth of 1500 nm) instead of the optical layered film. The results are shown in Table 2.

TABLE 1

|  |  | Ex. 1 | Ex. 2 | Ex. 3 | Ex. 4 | Ex. 5 |
| --- | --- | --- | --- | --- | --- | --- |
| Thermoplastic resin A | A layer | a1-s | a1-s | a1-s | a1-s | a1 |
| Thermoplastic resin B | B layer | film (1) | film (2) | film (3) | film (1) | film (3) |
| Layer configuration |  | A/B | A/B | A/B | A/B/A | A/B |
| Thickness-direction retardation absolute value [nm] | |Rthb| | 10 | 5 | 10 | 10 | 10 |
| Resin A: modulus of elasticity in flexure [MPa] | Ea | 437 | 437 | 437 | 437 | 760 |
| Resin B: modulus of elasticity in flexure [MPa] | Eb | 2500 | 2350 | 2500 | 2500 | 2500 |
| Resin A: tensile elongation at break [%] | Sa | 520 | 520 | 520 | 520 | 520 |
| Layer B: tensile elongation at break [%] | Sb | 9 | 55 | 21 | 9 | 21 |
| Thickness of layer A [μm] | ta | 11 | 11 | 11 | 11 | 11 |
| Thickness of layer B [μm] | tb | 50 | 45 | 35 | 50 | 35 |
| Ratio of weight fractions | wC/wD | 50/50 | 50/50 | 50/50 | 50/50 | 50/50 |
| Presence or absence of alkoxysilyl group in resin A |  | present | present | present | present | absent |
| Layer on outer side (a side to which tensile stress is applied) in bend resistance test |  | A | A | A | A | A |
| State of surface after bending (visual) |  | no change | no change | no change | crack | no change |
| Number of bending | ×10³ times | 100 | 100 | 100 | 50 | 100 |
| Presence or absence of iridescent unevenness on display |  | absent | absent | absent | absent | absent |

TABLE 2

| | | Comp. Ex. 1 | Comp. Ex. 2 | Comp. Ex. 3 | Comp. Ex. 4 |
|---|---|---|---|---|---|
| Thermoplastic resin A | A layer | — | — | resin (a2) | — |
| Thermoplastic resin B | B layer | film (1) | film (2) | film (3) | PET |
| Layer configuration | | B | B | A/B | B |
| Thickness-direction retardation absolute value [nm] | \|Rthb\| | 10 | 5 | 10 | 1500 |
| Resin A: modulus of elasticity in flexure [MPa] | Ea | — | — | 2100 | — |
| Resin B: modulus of elasticity in flexure [MPa] | Eb | 2500 | 2350 | 2500 | 5100 |
| Resin A: tensile elongation at break [%] | Sa | — | — | 2 | — |
| Layer B: tensile elongation at break [%] | Sb | 9 | 55 | 21 | 110 |
| Thickness of layer A [μm] | ta | — | — | 10 | — |
| Thickness of layer B [μm] | tb | 50 | 45 | 35 | 50 |
| Ratio of weight fractions | wC/wD | — | — | 85/15 | — |
| Presence or absence of alkoxysilyl group in resin A | | — | — | absent | — |
| Layer on outer side (a side to which tensile stress is applied) in bend resistance test | | B | B | A | B |
| State of surface after bending (visual) | | crack | crack | crack | fold and cloudiness present |
| Number of bending times | ×10³ times | 15 | 9 | 1 | 100 |
| Presence or absence of iridescent unevenness on display | | absent | absent | absent | iridescent unevenness present |

The terms in the above-described tables have the following meanings.

a1: a hydrogenated product (a1) of a triblock copolymer
a1-s: an alkoxysilyl-modified product (a1-s) of a hydrogenated product of a triblock copolymer
Film (1): a cycloolefin polymer film (1)
Film (2): a cycloolefin polymer film (2)
Film (3): a cycloolefin polymer film (3)
PET: polyethylene terephthalate
wC/wD: a ratio of weight fraction wC with respect to weight fraction wD in a block copolymer as a raw material for a resin A
Ea: a modulus of elasticity in flexure measured for a 4 mm-thick film formed of a resin A
Eb: a modulus of elasticity in flexure measured for a 4 mm-thick film formed of a resin B constituting a B layer
Sa: a tensile elongation at break measured for a 1.5 mm-thick film formed of a resin A
Sb: a tensile elongation at break measured for a layer B It is understood from the results described above that the films of Comparative Example 1 and Comparative Example 2 that included only the B layer without layering any A layer exhibited development of a crack in the films after significantly fewer bendings compared to the optical layered film of Examples. It is understood that, in the film of Comparative Example 4 whose thickness-direction retardation Rthb did not satisfy formula (1), iridescent unevenness was observed when the film was mounted on the display panel and a fold and cloudiness were observed in the film at the point of time when the film was bent 100×10³ times.

It is understood that the optical layered film of Comparative Example 3 whose tensile elongation at break Sa did not satisfy formula (2) exhibited development of a crack in the films after significantly fewer bendings compared to the optical layered film of Examples.

Accordingly, the results described above show that the optical layered film of the present invention has good bend resistance.

REFERENCE SIGN LIST

101 A layer
102 B layer
302, 303, 602, 603, 702, 703 electroconductive layer
350, 450, 550, 650, 750 touch panel member
100, 200 optical layered film
300, 400, 500, 600, 700 touch panel

The invention claimed is:

1. An optical layered film comprising at least one A layer including a thermoplastic resin [A] and a B layer formed of a thermoplastic resin [B], wherein
   the at least one A layer is provided on at least one of surfaces of the B layer,
   a thickness-direction retardation Rthb of the B layer satisfies the following formula (1),
   a tensile elongation at break Sa of a 1.5 mm-thick film (a1) formed of the thermoplastic resin [A] satisfies the following formula (2):

$$|Rthb| \leq 40 \text{ nm, and} \quad (1)$$

$$Sa \geq 100\%, \quad (2)$$

a modulus of elasticity in flexure Ea of a 4 mm-thick film (a2) formed of the thermoplastic resin [A] satisfies the following formula (3), and
   a modulus of elasticity in flexure Eb of a 4 mm-thick film (b) formed of the thermoplastic resin [B] satisfies the following formula (4):

$$300 \text{ MPa} \leq Ea \leq 900 \text{ MPa, and} \quad (3)$$

$$2200 \text{ MPa} \leq Eb \leq 2800 \text{ MPa}. \quad (4)$$

2. The optical layered film according to claim 1, wherein the thermoplastic resin [A] includes a hydrogenated product [2] of a block copolymer or an alkoxysilyl group-modified product [3] of the hydrogenated product [2] of the block copolymer,
   the hydrogenated product [2] of the block copolymer is a substance having a structure formed by hydrogenating the block copolymer [1],
   the block copolymer [1] includes two or more polymer blocks [C] per one molecule of the block copolymer [1] containing an aromatic vinyl compound unit, and one or more polymer blocks [D] per one molecule of the block copolymer [1] containing a chain conjugated diene compound unit, and a ratio (wC/wD) of a weight fraction wC of the polymer block [C] in an entirety of the block copolymer [1] with respect to a weight fraction wD of the polymer block [D] in the entirety of the block copolymer [1] is 30/70 to 60/40, and
   the hydrogenated product [2] of the block copolymer is a substance in which carbon-carbon unsaturated bonds of a main chain and a side chain of the block copolymer

[1] and carbon-carbon unsaturated bonds of an aromatic ring thereof have been hydrogenated.

3. The optical layered film according to claim 1, wherein the thermoplastic resin [B] includes a polymer containing an alicyclic structure.

4. A touch panel comprising a touch sensor member and an image display element, wherein
the touch sensor member includes a first electroconductive layer, the optical layered film according to claim 1, and a second electroconductive layer in this order, and is provided on a viewing side of the image display element.

5. A touch panel comprising a touch sensor member and an image display element, wherein
the touch sensor member includes a first electroconductive layer, the optical layered film according to claim 1, and a second electroconductive layer in this order, and is provided on a viewing side of the image display element,
the image display element is capable of being bent with a surface thereof on a viewing side thereof being inner side, and
the touch sensor member is disposed such that the surface on the viewing side of the image display element faces a surface of the optical layered film on a side of the A layer.

6. A touch panel comprising a touch sensor member and an image display element, wherein
the touch sensor member includes a first electroconductive layer, the optical layered film according to claim 1, and a second electroconductive layer in this order, and is provided on a viewing side of the image display element,
the image display element is capable of being bent with a surface thereof on a viewing side thereof being outer side, and
the touch sensor member is disposed such that the surface on the viewing side of the image display element faces a surface of the optical layered film on a side of the B layer.

7. An optical layered film comprising at least one A layer including a thermoplastic resin [A] and a B layer formed of a thermoplastic resin [B], wherein
the at least one A layer is provided on at least one of surfaces of the B layer,
a thickness-direction retardation Rthb of the B layer satisfies the following formula (1),
a tensile elongation at break Sa of a 1.5 mm-thick film (a1) formed of the thermoplastic resin [A] satisfies the following formula (2):

$$|Rthb| \leq 40 \text{ nm, and} \tag{1}$$

$$Sa \geq 100\%, \tag{2}$$

the thermoplastic resin [A] includes a hydrogenated product [2] of a block copolymer or an alkoxysilyl group-modified product [3] of the hydrogenated product [2] of the block copolymer,
the hydrogenated product [2] of the block copolymer is a substance having a structure formed by hydrogenating the block copolymer [1],
the block copolymer [1] includes two or more polymer blocks [C] per one molecule of the block copolymer [1] containing an aromatic vinyl compound unit, and one or more polymer blocks [D] per one molecule of the block copolymer [1] containing a chain conjugated diene compound unit, and a ratio (wC/wD) of a weight fraction wC of the polymer block [C] in an entirety of the block copolymer [1] with respect to a weight fraction wD of the polymer block [D] in the entirety of the block copolymer [1] is 30/70 to 60/40, and
the hydrogenated product [2] of the block copolymer is a substance in which carbon-carbon unsaturated bonds of a main chain and a side chain of the block copolymer [1] and carbon-carbon unsaturated bonds of an aromatic ring thereof have been hydrogenated.

8. The optical layered film according to claim 7, wherein a tensile elongation at break Sb of the B layer satisfies the following formula (5):

$$5\% \leq Sb \leq 60\%. \tag{5}$$

9. The optical layered film according to claim 7, wherein the thermoplastic resin [B] includes a polymer containing an alicyclic structure.

10. A touch panel comprising a touch sensor member and an image display element, wherein
the touch sensor member includes a first electroconductive layer, the optical layered film according to claim 7, and a second electroconductive layer in this order, and is provided on a viewing side of the image display element.

11. A touch panel comprising a touch sensor member and an image display element, wherein the touch sensor member includes a first electroconductive layer, the optical layered film according to claim 7, and a second electroconductive layer in this order, and is provided on a viewing side of the image display element, the image display element is capable of being bent with a surface thereof on a viewing side thereof being inner side, and the touch sensor member is disposed such that the surface on the viewing side of the image display element faces a surface of the optical layered film on a side of the A layer.

12. A touch panel comprising a touch sensor member and an image display element, wherein the touch sensor member includes a first electroconductive layer, the optical layered film according to claim 7, and a second electroconductive layer in this order, and is provided on a viewing side of the image display element, the image display element is capable of being bent with a surface thereof on a viewing side thereof being outer side, and the touch sensor member is disposed such that the surface on the viewing side of the image display element faces a surface of the optical layered film on a side of the B layer.

13. A touch panel comprising a touch sensor member and an image display element, wherein the touch sensor member includes a first electroconductive layer, an optical layered film, and a second electroconductive layer in this order, and is provided on a viewing side of the image display element, the image display element is capable of being bent with a surface thereof on a viewing side thereof being inner side, the touch sensor member is disposed such that the surface on the viewing side of the image display element faces a surface of the optical layered film on a side of the A layer, and the optical layered film includes at least one A layer including a thermoplastic resin [A] and a B layer formed of a thermoplastic resin [B], wherein the at least one A layer is provided on at least one of surfaces of the B layer, a thickness-direction retardation Rthb of the B layer satisfies the following formula (1), and a tensile elongation at break Sa of a 1.5 mm-thick film (a1) formed of the thermoplastic resin [A] satisfies the following formula (2): (1) $|Rthb| \leq 40$ nm, and (2) $Sa > 100\%$.

14. A touch panel comprising a touch sensor member and an image display element, wherein the touch sensor member includes a first electroconductive layer, an optical layered film, and a second electroconductive layer in this order, and is provided on a viewing side of the image display element, the image display element is capable of being bent with a surface thereof on a viewing side thereof being outer side, and the touch sensor member is disposed such that the surface on the viewing side of the image display element faces a surface of the optical layered film on a side of the B layer, and the optical layered film includes at least one A layer including a thermoplastic resin [A] and a B layer formed of a thermoplastic resin [B], wherein the at least one A layer is provided on at least one of surfaces of the B layer, a thickness-direction retardation Rthb of the B layer satisfies the following formula (1), and a tensile elongation at break Sa of a 1.5 mm-thick film (a1) formed of the thermoplastic resin [A] satisfies the following formula (2): (1) |Rthb|≤40 nm, and (2) Sa>100%.

* * * * *